Dec. 31, 1963 H. CLAAS 3,116,236
GRILLS OF COMBINE HARVESTERS
Filed July 31, 1961
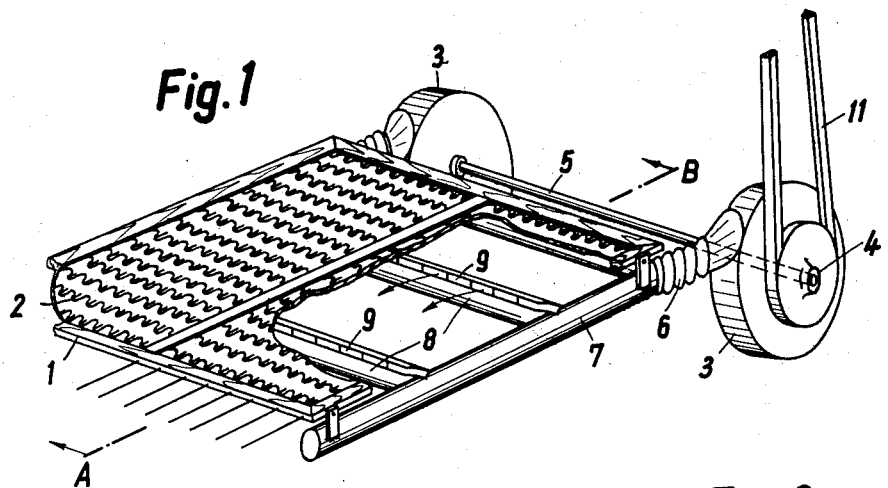
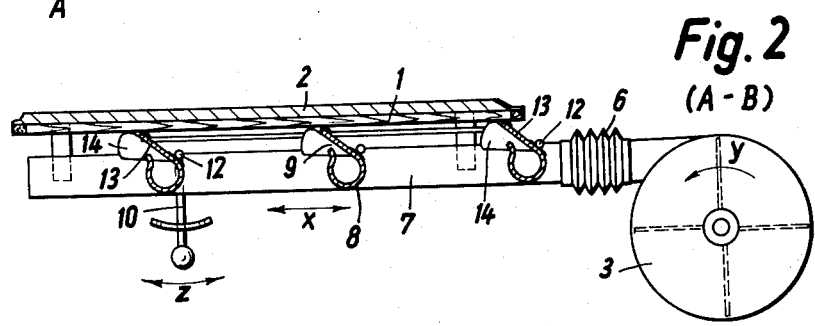
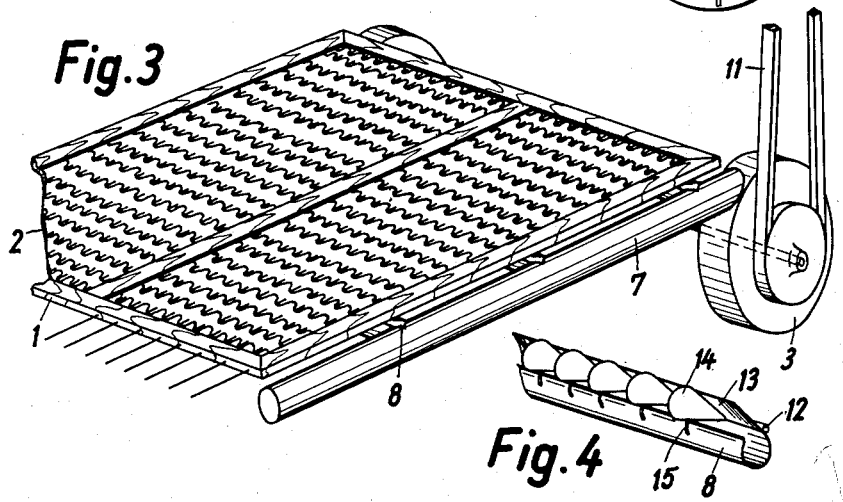
Inventor:
HELMUT CLAAS
By
Richards & Geier
ATTORNEYS United States Patent Office 3,116,236
Patented Dec. 31, 1963

3,116,236
GRILLS OF COMBINE HARVESTERS
Helmut Claas, am Kattenpatt 4, Harsewinkel,
Westphalia, Germany
Filed July 31, 1961, Ser. No. 128,126
Claims priority, application Germany Aug. 1, 1960
2 Claims. (Cl. 209—26)

This invention relates to combine harvesters and refers more particularly to grills of winnowing devices of combine harvesters.

In prior art slots were provided in side walls of boxes or frames to create a suction action. The drawback of such constructions is that slotted boxes or frames cannot be conveniently arranged in a combine harvester, and an edgewise blowing action produced in that case does not achieve even air distribution required for permanently maintaining the chaff in a floating state. It has also been proposed to make winnowing devices in the shape of transverse scrapers formed as hollow bodies with narrow slots directed against the surface of the grill, which in addition to their scraping action, suck air through the slots in the grill.

An object of the present invention is to improve the distribution of air beneath the grills of air-pressure winnowing devices.

Another object is to provide an even distribution of the air flow beneath the entire grill surface of a combine harvester even where the grill has a large surface area.

Grills of combine harvesters having large surface areas require an even air blast because the chaff must advantageously be kept continuously floating above the grill, in order to attain the best possible winnowing action with the smallest friction and the greatest operational speed. Since the blower in combine harvesters is arranged in the front of the grill box, the grill up to now has been subjected to a more intense blast at its front than at its back.

A further object of the invention is to provide even air distribution in machines using oscillating grills.

Other objects will become apparent in the course of the following specification.

According to the invention there is provided an air-pressure winnowing arrangement for combine harvesters having an oscillating grill in which air distribution tubes havig outlet nozzles are secured beneath or on the grills to distribute the air beneath the surface of the grill, said nozzles being disposed to produce a desired resistance to the flow and oscillating along with the grill.

Preferably, the nozzle tubes are air-smoothed and are so shaped that they blow the air obliquely onto the gaps of the grill, while the outer surfaces of their connections to the grill act as chutes for the grain falling through the gaps of the grill. For this purpose, the nozzles are preferably provided with suitably shaped flaps.

An important advantage of the construction of the present invention over prior art devices is that the present invention employs a pressure flow device instead of a suction device. A suction-flow device cannot contribute towards the continuous maintenance of the chaff in a state of suspension above the grill, because the action of the suction nozzles does not extend over the major portion of the upper surface of the grill. On the other hand, the pressure-flow device according to the invention, directs its high pressure flow towards and through the surface of the grill. The surface of the grill and the bulk grain lying thereon act as an equalizer; the diffused airflow thereby produced, which in the case of grills with a swinging action is distributed extremely evenly above the grill, acts as a continuous even screen of air which is distributed over the entire grill area and as a lift for the chaff, so that the latter floats above the grill.

The invention will appear more clearly from the following detailed description when taken in connection with the accompanying drawing, which shows two embodiments thereof by way of example only.

In the drawings:

FIGURE 1 is a perspective view of one construction according to the present invention, in which the air blowers are secured to the frame of the combine harvester;

FIGURE 2 is a section along the line A—B of FIGURE 1;

FIGURE 3 is a perspective view of a second embodiment in which the air blowers are firmly secured to the framework of the grill, and FIGURE 4 shows a detail in perspective.

FIGURES 1 and 2 show a framework 1 supporting a grill 2. Two air blowers 3 are secured in the framework of the combine harvester (not shown). The bearings 4 for the common shaft 5 of both blowers are also secured to the harvester frame. The drive for the blowers is effected by V-belts 11. The blowers 3 are connected to a frame- and distributor-tube 7 by means of bellows connections 6 known per se. Connector tubes 8 branch from the tube 7, and are provided with outlet nozzles or slots 9. The direction of air flow from the nozzles 9 is indicated by arrows in FIGURE 1.

The grill frame is of the oscillating type, and the frame- and distributor-tube 7 is an integral part thereof, the direction of oscillation being indicated by the arrow $x$ in FIGURE 2. Arrow $y$ in FIGURE 2 indicates the direction of rotation of the blower 3, and arrow $z$ indicates the range of adjustment for flaps 13 of the nozzles, said flaps being movable or swung about pivots 12.

In the embodiments of FIGURE 3 the blowers 3 are firmly secured to the frame- and distributor-tube 7, so that they are firmly connected to the framework of the grill. In other respects this construction is the same as the one previously described, similar parts being indicated by the same numerals.

FIGURE 4 shows the arrangement of the nozzle flaps 13 which are provided with guide plates 14 to direct the outflowing air. The connector tubes are provided with slots 15 for receiving the guide plates 14 when the flaps 13 are pivoted downwardly.

In all contructions air is distributed smoothly and there is only a small resistance to the air flow. The corn also flows smoothly, is met by little resistance and falls through the gaps of the grill.

It is apparent that various changes may be made in the described constructions within the scope of the appended claims.

What is claimed is:

1. An air-pressure winnowing device for combine harvesters, comprising a flat rectangular unitary structure comprising a rectangular flat framework, a grill supported by said framework, two distributor tubes extending along and adjacent to two parallel sides of the rectangular framework and firmly connected with said grill, and a plurality of parallel connector tubes extending transversely to said distributor tubes below said grill and firmly connected with said distributor tubes, whereby said structure is capable of being oscillated as a single unit, said connector tubes having air-smoothed outlet nozzles directed onto the gaps of the grill, whereby said connector tubes distribute air beneath the surface of the grill, at least one air blower, and means operatively connecting said air blower with said distributor tubes.

2. A winnowing device in accordance with claim 1, wherein the outlet nozzle in each of said connector tubes has a pair of parallel longitudinally directed edges, an elongated flap swingably connected with each connector tube alongside one of said parallel edges and being swingable in the direction of the other of said parallel edges for controlling air distribution to the grill, and a plurality of uniformly spaced apart guide plates firmly connected to one side of each of said flaps and extending perpendicularly thereto for uniformly distributing air transversely to the direction of its flow out of the nozzle and transversely to the direction of the connector tube, said connector tubes having slots uniformly spaced along said other parallel edge for receiving said guide plates when said flap is swung in the direction of said other parallel edge.

References Cited in the file of this patent
UNITED STATES PATENTS

| | | |
|---|---|---|
| 987,460 | Heldman | Mar. 21, 1911 |
| 2,554,416 | Morrissey | May 22, 1951 |
| 2,650,131 | Spooner | Aug. 25, 1953 |
| 2,751,079 | Ahlmann | June 19, 1956 |